United States Patent
Jung et al.

(10) Patent No.: US 11,929,206 B2
(45) Date of Patent: Mar. 12, 2024

(54) MULTILAYER ELECTRONIC COMPONENT HAVING IMPROVED HIGH TEMPERATURE LOAD LIFE AND MOISTURE RESISTANCE RELIABILITY

(71) Applicant: SAMSUNG ELECTRO-MECHANICS CO., LTD., Suwon-si (KR)

(72) Inventors: Dong Jun Jung, Suwon-si (KR); Yun Kim, Suwon-si (KR); Hyun Kim, Suwon-si (KR); Sim Chung Kang, Suwon-si (KR); Eun Jung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 23 days.

(21) Appl. No.: 17/476,995

(22) Filed: Sep. 16, 2021

(65) Prior Publication Data

US 2022/0223344 A1 Jul. 14, 2022

(30) Foreign Application Priority Data

Jan. 12, 2021 (KR) .................. 10-2021-0003969

(51) Int. Cl.
*H01G 4/008* (2006.01)
*H01G 4/012* (2006.01)
(Continued)

(52) U.S. Cl.
CPC ........... *H01G 4/0085* (2013.01); *H01G 4/012* (2013.01); *H01G 4/1227* (2013.01); *H01G 4/30* (2013.01)

(58) Field of Classification Search
CPC ...... H01G 4/0085; H01G 4/1227; H01G 4/30; H01G 4/1209; H01G 4/2325
See application file for complete search history.

(56) References Cited

U.S. PATENT DOCUMENTS

2007/0253140 A1 * 11/2007 Randall ............... H01G 4/30
361/300
2013/0321980 A1 12/2013 Suzuki et al.
(Continued)

FOREIGN PATENT DOCUMENTS

JP 2016-58719 A 4/2016
JP 2016-66783 A 4/2016
(Continued)

OTHER PUBLICATIONS

S. Suzuki, et al., "Effect of alloying Ni inner electrodes on the leakage current degradation of BaTiO3-based multilayer ceramic capacitors," Appl. Phys. Lett., vol. 116, No. 132903, 2020.
(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A multilayer electronic component includes: a body including dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; side margin portions disposed on the fifth and sixth surfaces, respectively; and external electrodes disposed on the third and fourth surfaces, respectively. The body includes an active portion including internal electrodes disposed alternately with the dielectric layers in the first direction, one of the internal electrodes includes a central portion and an interface portion disposed between the central portion and one of the dielectric layers, and the interface portion and one of the side margin portions include Sn.

16 Claims, 15 Drawing Sheets

(51) Int. Cl.
*H01G 4/12* (2006.01)
*H01G 4/30* (2006.01)

(56) References Cited

U.S. PATENT DOCUMENTS

| | | | |
|---|---|---|---|
| 2015/0155098 A1* | 6/2015 | Yamaguchi | H01G 13/00 |
| | | | 156/89.16 |
| 2016/0071647 A1 | 3/2016 | Nishisaka et al. | |
| 2016/0086733 A1 | 3/2016 | Saito et al. | |
| 2016/0155571 A1* | 6/2016 | Doi | H01G 4/12 |
| | | | 156/89.16 |
| 2016/0358712 A1 | 12/2016 | Doi et al. | |
| 2016/0358713 A1 | 12/2016 | Doi et al. | |
| 2017/0169952 A1* | 6/2017 | Kato | H01G 4/2325 |
| 2018/0130601 A1* | 5/2018 | Kim | H01G 4/33 |
| 2018/0204678 A1* | 7/2018 | Yamaguchi | H01G 4/12 |
| 2018/0268999 A1 | 9/2018 | Shimada et al. | |
| 2020/0058444 A1 | 2/2020 | Cha et al. | |
| 2020/0411248 A1* | 12/2020 | Hashimoto | H01G 4/008 |
| 2021/0098191 A1* | 4/2021 | Saito | H01G 4/1227 |
| 2021/0202172 A1* | 7/2021 | Kanzaki | H01G 4/008 |
| 2021/0202180 A1* | 7/2021 | Fukunaga | H01G 4/012 |
| 2022/0102075 A1* | 3/2022 | Kitahara | H01G 4/224 |
| 2022/0139630 A1* | 5/2022 | Yamada | H01G 4/232 |
| | | | 361/321.2 |

FOREIGN PATENT DOCUMENTS

| | | | | |
|---|---|---|---|---|
| KR | 10-1581925 B1 | 12/2015 | | |
| KR | 10-1607536 B1 | 3/2016 | | |
| KR | 10-2016-0143516 A | 12/2016 | | |
| KR | 10-1815444 B1 | 1/2018 | | |
| KR | 10-2019-0121149 A | 10/2019 | | |
| KR | 2019121152 A | * 10/2019 | | H01G 4/005 |
| KR | 10-2121550 B1 | 6/2020 | | |

OTHER PUBLICATIONS

T. Ito, et al., "Shallow donor level associated with hydrogen impurities in undoped BaTiO3," Appl. Phys. Lett., vol. 103, No. 042905, 2013.

* cited by examiner

30nm　　　　　　　　　　　　　　30nm

30nm

30nm

30nm  30nm

# MULTILAYER ELECTRONIC COMPONENT HAVING IMPROVED HIGH TEMPERATURE LOAD LIFE AND MOISTURE RESISTANCE RELIABILITY

CROSS-REFERENCE TO RELATED APPLICATION(S)

This application claims benefit of priority to Korean Patent Application No. 10-2021-0003969 filed on Jan. 12, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. In accordance with miniaturization and an increase in output of various electronic apparatuses such as computers and mobile devices, a demand for miniaturization and a capacitance increase of the multilayer ceramic capacitors has increased.

In addition, recently, in accordance with an increase in an interest in electronic components for a vehicle in the industry, the multilayer ceramic capacitors have also been required to have high reliability and high strength characteristics in order to be used in the vehicle or an infotainment system.

In order to miniaturize the multilayer ceramic capacitor and increase a capacitance of the multilayer ceramic capacitor, it has been required to significantly increase an electrode effective area (increase an effective volume fraction required for implementing a capacitance).

In order to implement the miniature and high-capacitance multilayer ceramic capacitor as described above, in manufacturing the multilayer ceramic capacitor, a method of significantly increasing areas of internal electrodes in a width direction of a body through a design that does not have margins by exposing the internal electrodes in the width direction of the body and separately attaching side margin portions to electrode exposed surfaces of the multilayer ceramic capacitor in the width direction in a step after the multilayer ceramic capacitor is manufactured and before the multilayer ceramic capacitor is sintered to complete the multilayer ceramic capacitor has been used.

Capacitance of the multilayer ceramic capacitor per unit volume of the multilayer capacitor may be improved by a method of separately attaching the side margin portions, but there is a problem that reliability of the multilayer ceramic capacitor may be decreased due to a decrease in a thickness of the side margin portions.

In addition, in order to improve the reliability of the multilayer ceramic capacitor, development has been conducted so as to increase the number of grain boundaries by suppressing grain growth of dielectric grains. However, when the grain growth of the dielectric grains is suppressed, a dielectric constant is decreased, such that it is difficult to increase capacitance of the multilayer ceramic capacitor.

SUMMARY

An aspect of the present disclosure may provide a multilayer electronic component in which reliability is improved.

Another aspect of the present disclosure may provide a multilayer electronic component having high reliability, a small size, and high capacitance.

According to an aspect of the present disclosure, a multilayer electronic component may include: a body including dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; side margin portions disposed on the fifth and sixth surfaces, respectively; and external electrodes disposed on the third and fourth surfaces, respectively. The body may include an active portion including internal electrodes disposed alternately with the dielectric layers in the first direction and cover portions disposed on opposite end surfaces of the active portion in the first direction, respectively, one of the internal electrodes may include a central portion and an interface portion disposed between the central portion and one of the dielectric layers, and the interface portion and one of the side margin portions may include Sn.

According to an aspect of the present disclosure, a method of manufacturing a multilayer electronic component may include: forming a laminate by stacking second ceramic green sheets on which a conductive paste is respectively formed; cutting the laminate so that internal electrodes made of the conductive paste are exposed to opposing surfaces of the cut laminate; attaching first ceramic green layers including Sn respectively on the opposing surfaces so as to form side margin portions on the cut laminate; sintering the cut laminate and the side margin portions, so that an interface portion between one of the internal electrodes and one of the dielectric layers made of one the second ceramic green sheets includes Sn and one of the side margin portions made of one of the first dielectric layers includes Sn; and forming external electrodes to connected to the internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
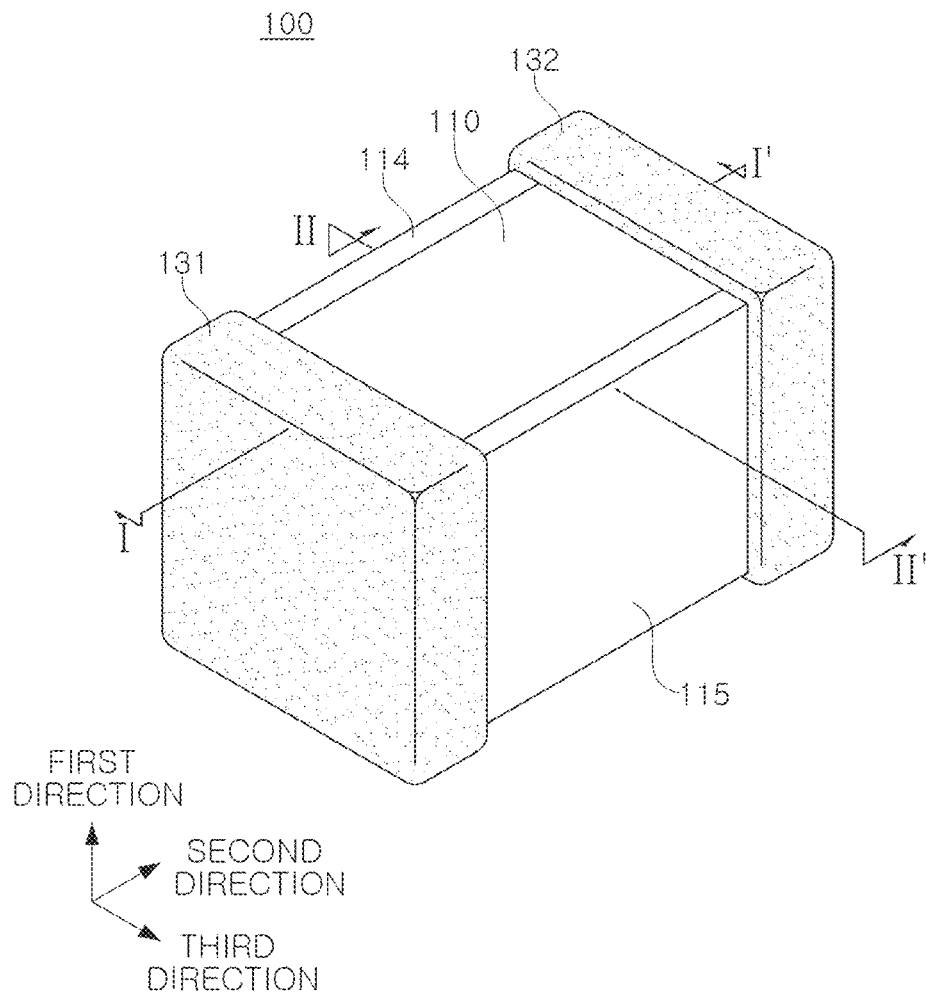
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings.

In the drawings, a first direction may refer to a stacked direction or a thickness T direction, a second direction may refer to a length L direction, and a third direction may refer to a width W direction.

Multilayer Electronic Component

FIG. 1 is a schematic perspective view illustrating a multilayer electronic component according to an exemplary embodiment in the present disclosure.

Figure 2:
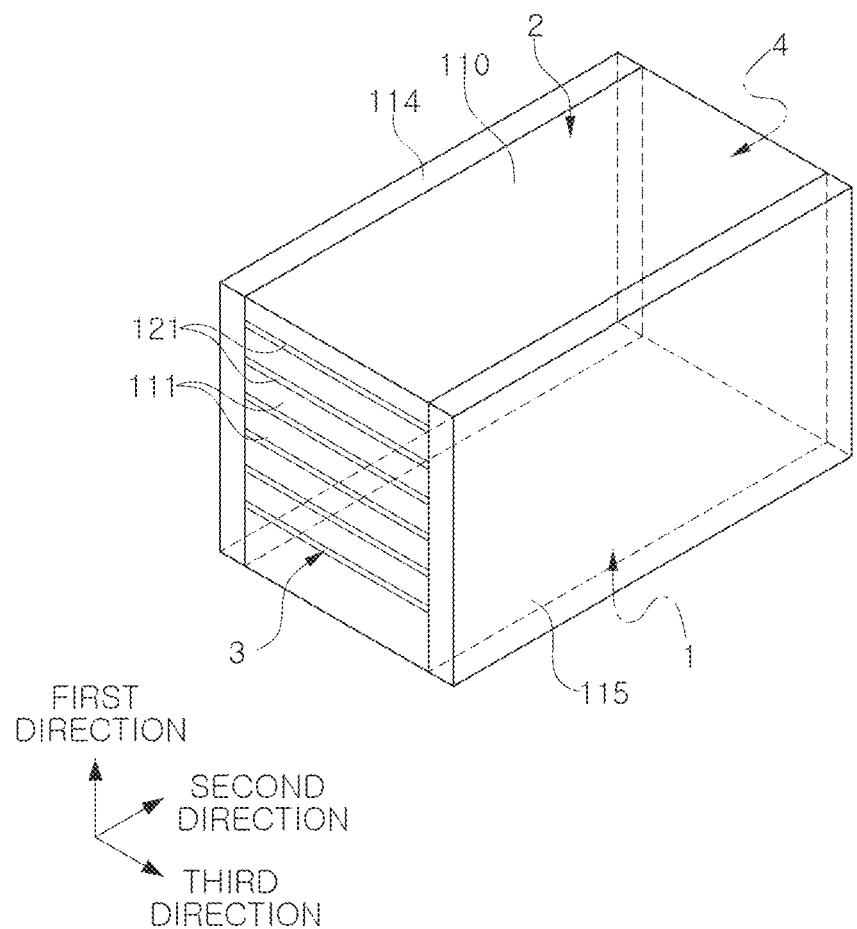
FIG. 2 is a perspective view illustrating a body in a state in which external electrodes are excluded from the multilayer electronic component of FIG. 1.

FIG. 2 is a perspective view illustrating a body in a state in which external electrodes are excluded from the multilayer electronic component of FIG. 1.

Figure 3:
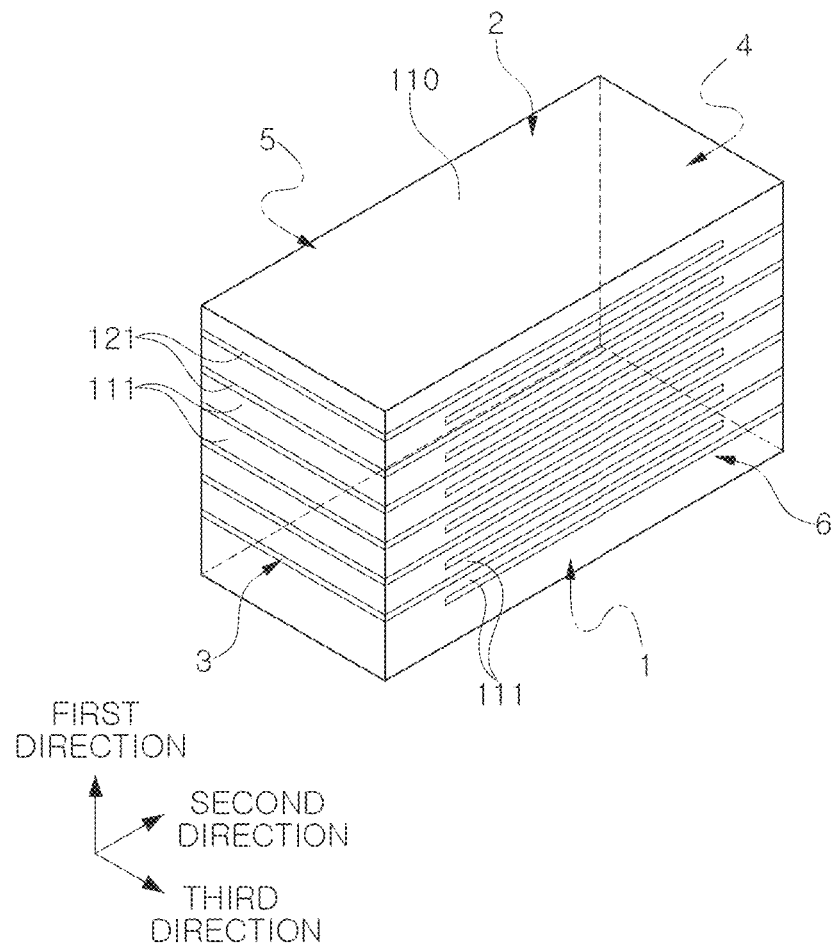
FIG. 3 is a perspective view illustrating the body in a state in which the external electrodes and side margin portions are excluded from the multilayer electronic component of FIG. 1.

FIG. 3 is a perspective view illustrating the body in a state in which the external electrodes and side margin portions are excluded from the multilayer electronic component of FIG. 1.

Figure 4:
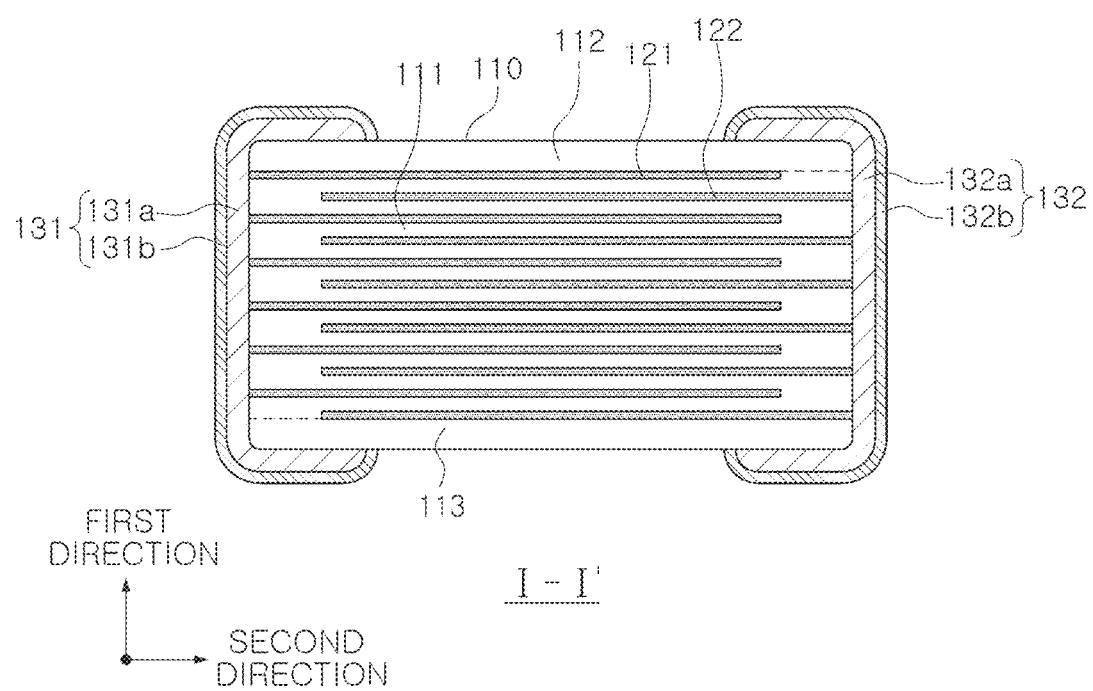
FIG. 4 is a cross-sectional view taken along line I-I' of FIG. 1.

FIG. 4 is a cross-sectional view taken along line I-I' of FIG. 1.

Figure 5:
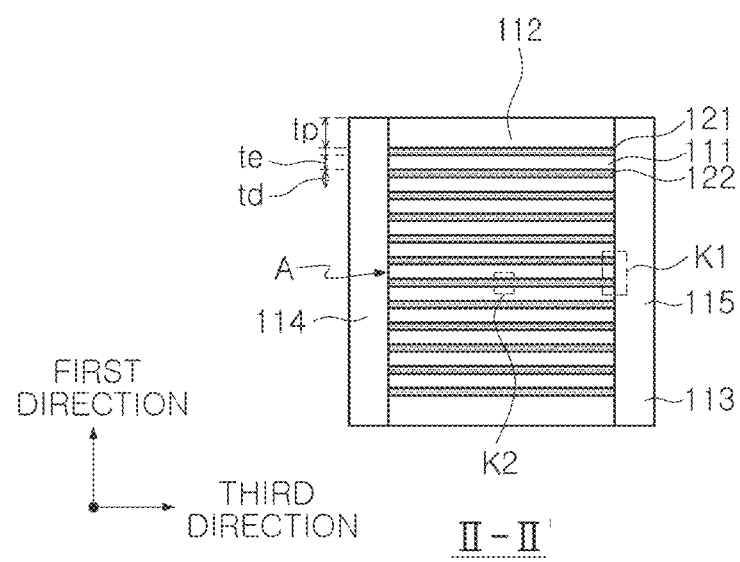
FIG. 5 is a cross-sectional view taken along line II-II' of FIG. 1.

FIG. 5 is a cross-sectional view taken along line II-II' of FIG. 1.

Figure 6:
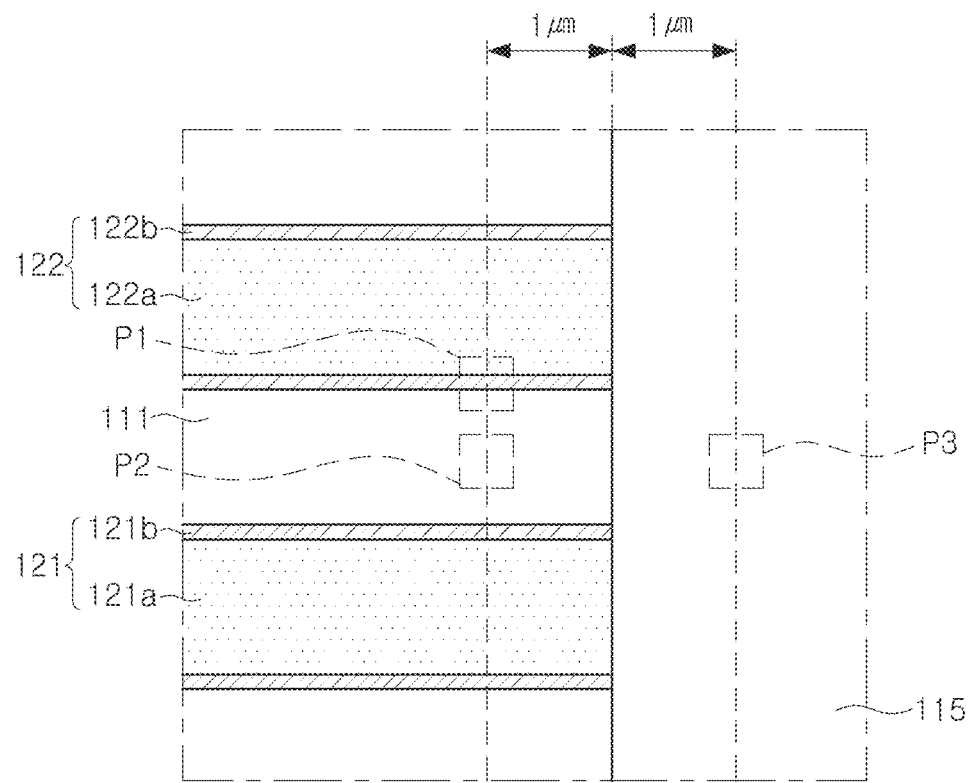
FIG. 6 is an enlarged view of region K1 of FIG. 5.

FIG. 6 is an enlarged view of region K1 of FIG. 5.

Figure 7:
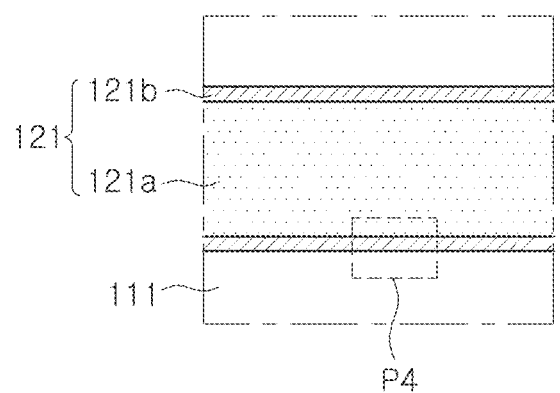
FIG. 7 is an enlarged view of region K2 of FIG. 5.

FIG. 7 is an enlarged view of region K2 of FIG. 5.

Hereinafter, a multilayer electronic component according to an exemplary embodiment in the present disclosure will be described in detail with reference to FIGS. 1 through 7.

A multilayer electronic component 100 according to an exemplary embodiment in the present disclosure may include: a body 110 including a plurality of dielectric layers 111 and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; side margin portions 114 and 115 disposed on the fifth and sixth surfaces, respectively; and external electrodes 131 and 132 disposed on third and fourth surfaces, respectively. The body includes an active portion A including internal electrodes 121 and 122 disposed alternately with the dielectric layers in the first direction and cover portions 112 and 113 disposed on opposite end surfaces of the active portion in the first direction, respectively, and the internal electrodes 121 and 122 include, respectively, central portions 121$a$ and 122$a$ and interface portions 121$b$ and 122$b$ disposed between the central portions and the dielectric layers, respectively, and the interface portions and the side margin portions include Sn.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, or a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$.

A material of the dielectric layer 111 may include various ceramic additives, organic solvents, binders, dispersants, and the like, added to powders such as barium titanate (BaTiO$_3$) powders, or the like, according to an object of the present disclosure.

Meanwhile, a thickness td of the dielectric layer 111 does not need to be particularly limited. However, the thickness td of the dielectric layer 111 may be 0.6 μm or less in order to more easily achieve miniaturization and an increase in capacitance of the multilayer electronic component. Here, the thickness td of the dielectric layer 111 may refer to an average thickness of the dielectric layer 111.

The average thickness of the dielectric layers 111 may be measured from an image obtained by scanning a cross section of the body 110 in the length and thickness (L-T) directions with a scanning electron microscope (SEM).

For example, with respect to any one of the dielectric layer extracted from the image obtained by scanning the cross section of the body 110 in the length and thickness (L-T) directions with the scanning electron microscope (SEM) after cutting a central portion of the body 110 in the width direction, thicknesses of the dielectric layer may be measured at 30 points arranged at equal intervals in the length direction to obtain an average value thereof.

The thicknesses of the dielectric layer measured at the 30 points arranged at equal intervals may be measured in a capacitance forming portion A referring to a region where the first and second internal electrodes 121 and 122 overlap each other.

The body 110 may include the active portion A disposed in the body 110 and forming capacitance by including first internal electrodes 121 and second internal electrodes 122 disposed to face each other with each of the dielectric layers 111 interposed therebetween and the cover portions 112 and 113 formed on upper and lower surfaces of the active portion A in the first direction, respectively.

In addition, the active portion A, which contributes to forming capacitance of a multilayer ceramic capacitor, may be formed by repeatedly stacking a plurality of first and second internal electrodes 121 and 122 with each of the dielectric layers 111 interposed therebetween.

The upper cover portion 112 and the lower cover portion 113 may be formed by stacking a single dielectric layer or two or more dielectric layers on the upper and lower surfaces of the active portion A in the thickness direction, respectively, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate (BaTiO$_3$)-based ceramic material.

Meanwhile, a thickness of each of the cover portions 112 and 113 does not need to be particularly limited. However, the thickness tp of each of the cover portions 112 and 113 may be 20 μm or less in order to more easily achieve miniaturization and a capacitance increase of the multilayer electronic component.

In addition, the side margin portions 114 and 115 may be disposed on side surfaces of the active portion A.

The side margin portions 114 and 115 may include a first side margin portion 114 disposed on the fifth surface 5 of the body 110 and a second side margin portion 115 disposed on the sixth surface 6. That is, the side margin portions 114 and 115 may be disposed on opposite end surfaces of the body 110 in the third direction, respectively.

The side margin portions 114 and 115 may basically serve to prevent damage to the internal electrodes due to physical or chemical stress.

The side margin portions 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite end surfaces of the active portion A in the width direction, in order to suppress a step due to the internal electrodes 121 and 122.

The internal electrodes 121 and 122 may be disposed alternately with the dielectric layer 111.

The internal electrodes 121 and 122 may include first and second internal electrodes 121 and 122. The first and second internal electrodes 121 and 122 may be alternately disposed to face each other with each of the dielectric layers 111 constituting the body 110 interposed therebetween, and may be exposed to the third and fourth surfaces 3 and 4 of the body 110, respectively.

Referring to FIG. 3, the first internal electrodes 121 may be spaced apart from the fourth surface 4 and be exposed through the third surface 3, and the second internal electrodes 122 may be spaced apart from the third surface 3 and be exposed through the fourth surface 4. In addition, the first internal electrodes 121 may be exposed through the third, fifth and sixth surfaces 3, 5, and 6, and the second internal electrodes 122 may be exposed through the fourth, fifth and sixth surfaces 4, 5, and 6.

In this case, the first and second internal electrodes 121 and 122 may be electrically separated from each other by each of the dielectric layers 111 disposed therebetween.

The internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Meanwhile, a thickness to of each of the internal electrodes 121 and 122 does not need to be particularly limited. However, the thickness te of each of the internal electrodes 121 and 122 may be 0.6 μm or less in order to more easily achieve miniaturization and an increase in capacitance of the multilayer electronic component. Here, the thickness te of each of the internal electrodes 121 and 122 may refer to an average thickness of each of the first and second internal electrodes 121 and 122.

The internal electrodes 121 and 122 may include, respectively, the central portions 121a and 122a and the interface portions 121b and 122b disposed between the central portions and the dielectric layers 111, respectively, and the interface portions 121b and 122b and the side margin portions 114 and 115 may include Sn.

In order to implement a miniature and high-capacitance multilayer ceramic capacitor, in manufacturing the multilayer ceramic capacitor, a method of significantly increasing areas of internal electrodes in a width direction of a body through a design that does not have margins by exposing the internal electrodes in the width direction of the body and separately attaching side margin portions to electrode exposed surfaces of the multilayer ceramic capacitor in the width direction in a step after the multilayer ceramic capacitor is manufactured and before the multilayer ceramic capacitor is sintered to complete the multilayer ceramic capacitor has been used. Capacitance of the multilayer ceramic capacitor per unit volume of the multilayer capacitor may be improved by a method of separately attaching the side margin portions, but there is a problem that reliability of the multilayer ceramic capacitor may be decreased due to a decrease in a thickness of the side margin portions. In addition, in order to improve the reliability of the multilayer ceramic capacitor, development has been conducted so as to increase the number of grain boundaries by suppressing grain growth of dielectric grains. However, when the grain growth of the dielectric grains is suppressed, a dielectric constant is decreased, such that it is difficult to increase capacitance of the multilayer ceramic capacitor.

Therefore, an attempt to improve the reliability of the multilayer ceramic capacitor by adding Sn to the internal electrodes has been conducted, but there was a problem that when Sn is added to a conductive paste for an internal electrode, an existing sintering condition needs to be changed, and it becomes significantly difficult to control sintering behavior and dielectric characteristics due to Sn diffused into the dielectric layers.

According to an exemplary embodiment in the present disclosure, reliability of the multilayer electronic component may be improved without needing to significantly change a design and a sintering condition of the active portion according to the related art by adding Sn to the side margin portions instead of adding Sn to the internal electrodes to include Sn in the interface portions 121b and 122b of the internal electrodes 121 and 122 and the side margin portions 114 and 115.

Sn included in the interface portions 121b and 122b of the internal electrodes 121 and 122 may serve to increase a Schottky barrier on interfaces between the internal electrodes 121 and 122 and the dielectric layers 111 to improve a high temperature load life and moisture resistance reliability of the multilayer electronic component.

In addition, hydrogen generated in a plating process for forming plating layers 131b and 132b of the external electrodes 131 and 132 may be diffused to the dielectric layers through electrode layers and the internal electrodes, such that reliability of the multilayer electronic component may be decreased, but according to an exemplary embodiment in the present disclosure, Sn included in the interface portions 121b and 122b of the internal electrodes 121 and 122 may adsorb hydrogen to suppress diffusion of hydrogen to the dielectric layers 111 through the electrode layers 131a and 132a and the internal electrodes 121 and 122. Therefore, a decrease in reliability of the multilayer electronic component due to the diffusion of hydrogen may be suppressed.

In an exemplary embodiment, a content of Sn included in the interface portions 121b and 122b and the side margin portions 114 and 115 may be higher than that of Sn included in the dielectric layers 111 and the central portions 121a and 122a.

In this case, a maximum value of the content of Sn in the interface portions 121b and 122b may be 0.3 at % or more and 1.0 at % or less. The reason is that when the maximum value of the content of Sn in the interface portions 121b and 122b is less than 0.3 at %, a reliability improving effect of the multilayer electronic component may be insufficient, and when the maximum value of the content of Sn in the interface portions 121b and 122b exceeds 1.0 at %, Sn may be diffused to the dielectric layers 111, such that it may be difficult to control sintering behavior and dielectric characteristics.

In addition, an average value of the content of Sn in the interface portions 121b and 122b may be 0.25 at % or more and 0.7 at % or less.

Here, the maximum value and the average value of the content of Sn in the interface portions 121b and 122b may be measured at an interface portion positioned at a central portion of the body in the first and third directions in a cross section of the body cut in the first and third directions at the center of the body in the second direction. In addition, a line profile may be performed on five lines perpendicular to the interface portion and arranged at equal intervals to obtain maximum values and average values of contents of Sn in each line, an arithmetic average value of the maximum values of the contents of Sn in the interface portion obtained from the five lines may be used as the maximum value of the content of Sn at the interface portions 121b and 122b, and an arithmetic average value of the average values of the contents of Sn in the interface portion obtained from the five lines may be used as the average value of the content of Sn at the interface portions 121b and 122b.

In an exemplary embodiment, a thickness of the interface portions 121b and 122b may be 1 nm or more and 5 nm or less. The reason is that when the thickness of the interface portions 121b and 122b is less than 1 nm, a reliability improving effect of the multilayer electronic component may be insufficient, and when the thickness of the interface portions 121b and 122b exceeds 5 nm, Sn may be diffused to the dielectric layers 111, such that it may be difficult to control sintering behavior and dielectric characteristics.

In this case, the thickness of the interface portions 121b and 122b may refer to a full width at half maximum (FWHM) of a content of Sn in the interfaces between the dielectric layers 111 and the internal electrodes 121 and 122. Here, the FWHM refers to a width of a distribution corresponding to ½ of a maximum value in a curve representing a distribution having a mountain shape.

In an exemplary embodiment, the content of Sn included in the dielectric layers 111 and the central portions 121a and 122a may be 0.1 at % or less. That is, the dielectric layers 111 and the central portions 121a and 122a hardly include Sn. In this case, the content of Sn may be measured by quantitative analysis using a high-sensitivity analysis equipment such as a laser ablation-inductively coupled plasma-mass spectrometry (LA-ICP-MS), a secondary ion mass spectrometry (SIMS), and an atom probe tomography (APT). However, in a case of performing a line profile using a scanning transmission electron microscopy-energy dispersive spectroscopy (STEM-EDS), it may be measured that some Sn is detected, which may be determined as a noise.

When Sn is included in the interface portions 121b and 122b, it may contribute to improvement of a high-temperature load life and reliability of the multilayer electronic component, but when Sn is included in the dielectric layers 111 and the central portions 121a and 122a, an influence of Sn included in the dielectric layers 111 and the central portions 121a and 122a on a high-temperature load life and reliability of the multilayer electronic component may be insignificant. Therefore, it may be preferable to significantly decrease the content of Sn included in the dielectric layers 111 and the central portions 121a and 122a. In order to obtain such a distribution of Sn, it may be preferable not to add Sn to the conductive paste for an internal electrode, but to add Sn to a ceramic green sheet for a side margin portion.

In an exemplary embodiment, in the cross section of the body cut in the first and third directions at the center of the body in the second direction, a content of Sn included in the dielectric layer in a region spaced apart from a boundary between the active portion and the side margin portion toward the active portion by 1 μm may be 0.1 at % or less, and a content of Sn included in the side margin portion in a region spaced apart from the boundary between the active portion and the side margin portion outwardly of the side margin portion by 1 μm may be 0.2 at % or more and 1.0 at % or less.

In an exemplary embodiment, the side margin portions 114 and 115 may be formed by stacking first ceramic green sheets including 0.2 mol or more and 4.0 mol or less of Sn based on 100 mol of $BaTiO_3$ in the third direction. When the content of Sn is less than 0.2 mol based on 100 mol of $BaTiO_3$, the interface portion may not be sufficiently secured, such that a reliability improving effect may be insufficient, and when the content of Sn exceeds 4.0 mol based on 100 mol of $BaTiO_3$, Sn may be diffused into the dielectric layers 111, such that it may become difficult to control sintering behavior and dielectric characteristics.

Meanwhile, more preferably, in order to more easily secure the interface portions, the side margin portions 114 and 115 may be formed by stacking first ceramic green sheets including 1.0 mol or more and 4.0 mol or less of Sn based on 100 mol of $BaTiO_3$ in the third direction.

In an exemplary embodiment, the dielectric layers 111 may be formed by stacking second ceramic green sheets that do not include Sn in the first direction. This is because it may become difficult to control sintering behavior and dielectric characteristics when Sn is included in the dielectric layers 111.

In an exemplary embodiment, the internal electrodes 121 and 122 may be formed by applying a conductive paste for an internal electrode that does not include Sn on the second ceramic green sheets. When Sn is added to the conductive paste for an internal electrode, an existing firing condition needs to be changed, and it may become difficult to control sintering behavior and dielectric characteristics due to Sn diffused into the dielectric layers 111.

The external electrodes 131 and 132 are disposed on the third surface 3 and the fourth surface 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the side margin portions 114 and 115 in the second direction, respectively.

A structure in which the multilayer electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

In an exemplary embodiment, the external electrodes 131 and 132 may include the first external electrode 131 disposed on the third surface of the body 110 and the second external electrode 132 disposed on the fourth surface of the body 100 and the internal electrodes 121 and 122 may include the first internal electrodes 121 in contact with the first external electrode 131 and the second internal electrodes 122 in contact with the second external electrode 132, and both end portions of the first and second internal electrodes 121 and 122 in the third direction may be in contact with the side margin portions 114 and 115.

Meanwhile, the external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multilayer structure.

For example, the external electrodes 131 and 132 may include, respectively, electrode layers 131a and 132a disposed on the body 110, and plating layers 131b and 132b each disposed on the electrode layers 131a and 132a.

As a more specific example of the electrode layers 131a and 132a, the electrode layers 131a and 132a may be fired electrodes including a conductive metal and glass or resin-based electrodes including a conductive metal or a resin.

Alternatively, the electrode layers 131a and 132a may have a form in which fired electrodes and resin electrodes are sequentially formed on the body. In addition, the electrode layers 131a and 132a may be formed in a manner of transferring a sheet including a conductive metal onto the body or be formed in a manner of transferring a sheet including a conductive metal onto a fired electrode.

The conductive metal included in the electrode layers 131a and 132a may be a material having excellent electrical connectivity, but is not particularly limited thereto. For example, the conductive metal may be one or more of nickel (Ni), copper (Cu), and alloys thereof.

The plating layers 131b and 132b may serve to improve mounting characteristics of the multilayer electronic component. A type of the plating layers 131b and 132b is not particularly limited. That is, each of the plating layers 131b and 132b may be a plating layer including one or more of Ni, Sn, Pd, and alloys thereof, and may be formed as a plurality of layers.

As a more specific example of the plating layers 131b and 132b, the plating layers 131b and 132b may be Ni plating layers or Sn plating layers, may have a form in which Ni plating layers and Sn plating layers are sequentially formed on the electrode layers 131a and 132a, respectively, or may have a form in which Sn plating layers, Ni plating layers, and Sn plating layers are sequentially formed. Alternatively, the plating layers 131b and 132b may include a plurality of Ni plating layers and/or a plurality of Sn plating layers.

A size of the multilayer electronic component 100 need not be particularly limited.

However, since the numbers of stacked dielectric layers and internal electrodes need to be increased by decreasing thicknesses of the dielectric layers and the internal electrodes in order to achieve both of the miniaturization and the capacitance increase of the multilayer electronic component, a reliability improving effect according to the present disclosure in a multilayer electronic component 100 having a size of 1005 (length×width: 1.0 mm×0.5 mm) or less may become more remarkable.

Hereinafter, the present disclosure will be described in more detail through Experimental Example. However, Experimental Example is to assist in the detailed understanding of the present disclosure, and the scope of the present disclosure is not limited by Experimental Example.

Experimental Example

A conductive paste for an internal electrode was applied onto a ceramic green sheet for an active portion, the ceramic green sheets onto which the conductive paste is applied were stacked in the first direction to form a laminate, the laminate was cut into a chip unit to prepare a body, ceramic green sheets for a side margin portion were stacked on opposite end surfaces of the body in the third direction in the third direction and then fired to form external electrodes, thereby manufacturing a sample chip.

In Comparative Example, Sn was not added to the conductive paste for an internal electrode, the ceramic green sheet for an active portion, and the ceramic green sheet for a side margin portion. In an Inventive Example, 3.0 mol of Sn based on 100 mol of $BaTiO_3$ was added only to the ceramic green sheet for a side margin portion, and Sn was not added to the conductive paste for an internal electrode and the ceramic green sheet for an active portion.

A cross section of a sample chip cut in the first and third directions in the center of the sample chip in the second direction was analyzed.

Figure 8A:
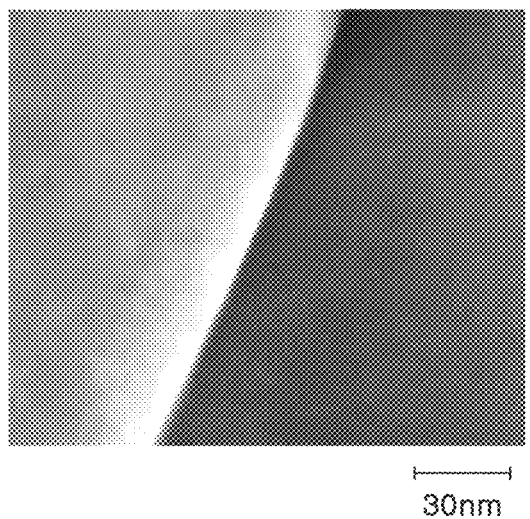
FIGS. 8A and 8B are an image obtained by scanning a portion corresponding to region P1 of FIG. 6 with a scanning transmission electron microscope (STEM) and an image illustrating a result obtained by mapping a Sn element with a scanning transmission electron microscope-energy dispersive spectroscopy (STEM-EDS) in Comparative Example, respectively.
Figure 8B:
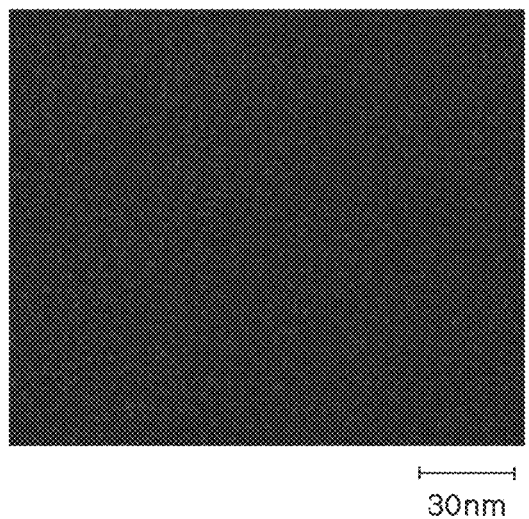
Figure 9A:
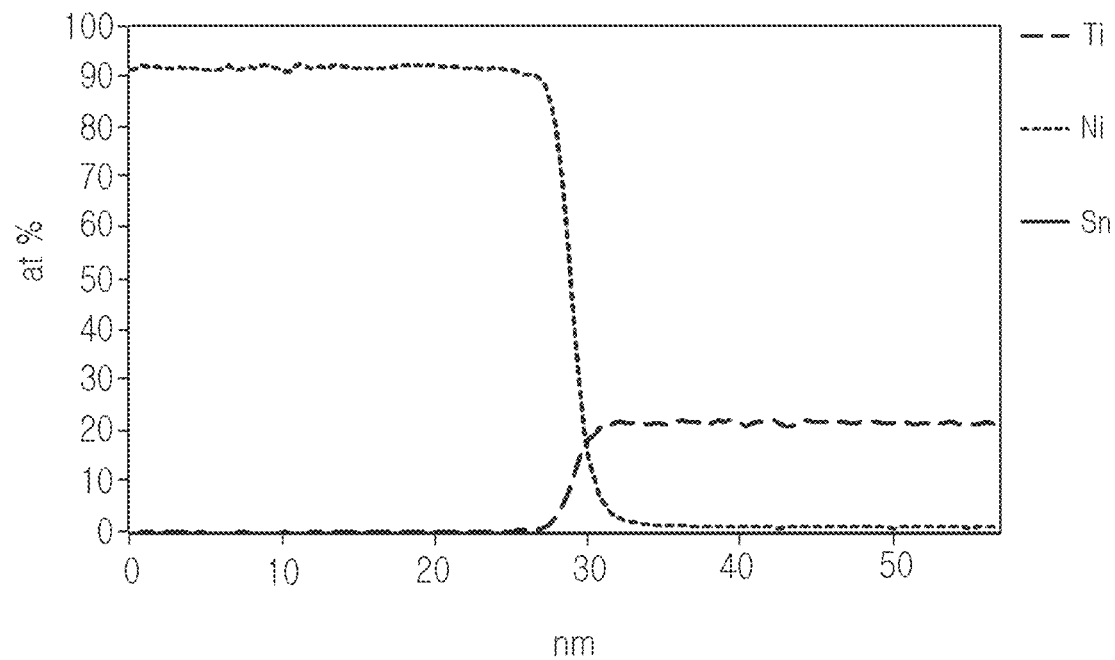
FIGS. 9A and 9B are graphs illustrating results obtained by performing a line profile using an STEM-EDS in a direction perpendicular to an interface between a dielectric layer and an internal electrode in FIGS. 8A and 8B.
Figure 9B:
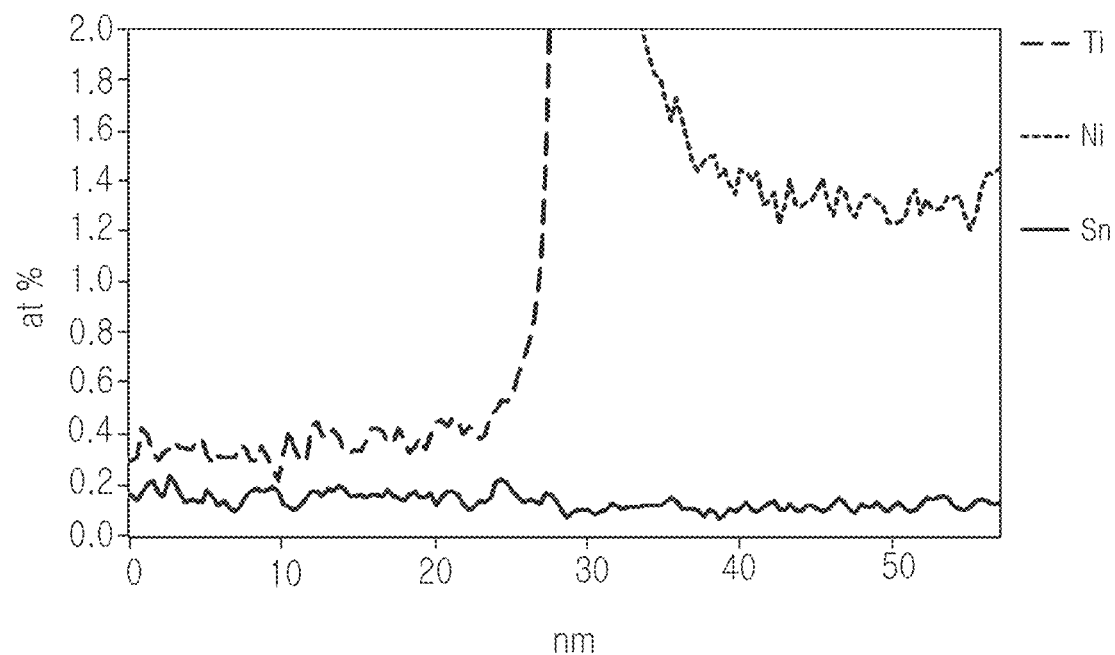

First, a portion corresponding to region P1 (an interface between the dielectric layer and the internal electrode in a region spaced apart from a boundary surface between the active portion and the side margin portion toward the active portion by 1 μm) of FIG. 6 was analyzed. FIGS. 8A and 8B are an image obtained by scanning a portion corresponding to region P1 of FIG. 6 with a scanning transmission electron microscope (STEM) and an image illustrating a result obtained by mapping a Sn element with a scanning transmission electron microscope-energy dispersive spectroscopy (STEM-EDS) in Comparative Example, respectively, and FIGS. 9A and 9B are graphs illustrating results obtained by performing a line profile using an STEM-EDS in a direction perpendicular to an interface between a dielectric layer and an internal electrode in FIGS. 8A and 8B. FIG. 9B is an enlarged view of a portion of 0 at % to 2.0 at % in FIG. 9A.

As can be seen in FIGS. 8A through 9B, Sn was not detected in any region in Comparative Example. However, it was measured that some Sn exists in the line profile of FIGS. 9A and 9B, but in Comparative Example, Sn was not added to all of the conductive paste for an internal electrode, the ceramic green sheet for an active portion, and the ceramic green sheet for a side margin portion, and it may thus be determined as a value corresponding to noise.

Figure 10A:
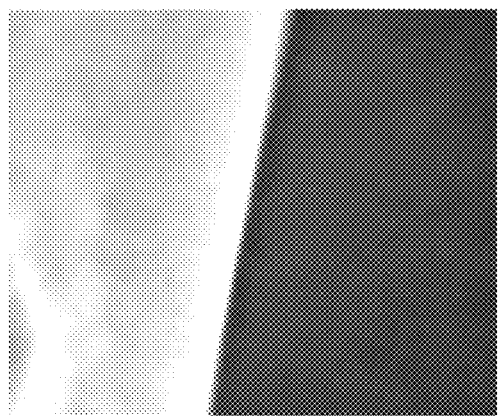
FIGS. 10A and 10B are an image obtained by scanning a portion corresponding to region P1 of FIG. 6 with an STEM and an image illustrating a result obtained by mapping a Sn element with an STEM-EDS in an Inventive Example, respectively.
Figure 10B:
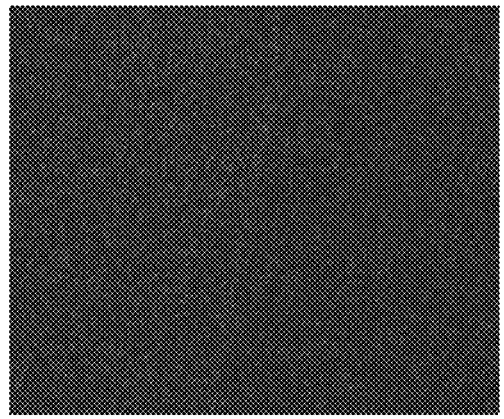
Figure 11A:
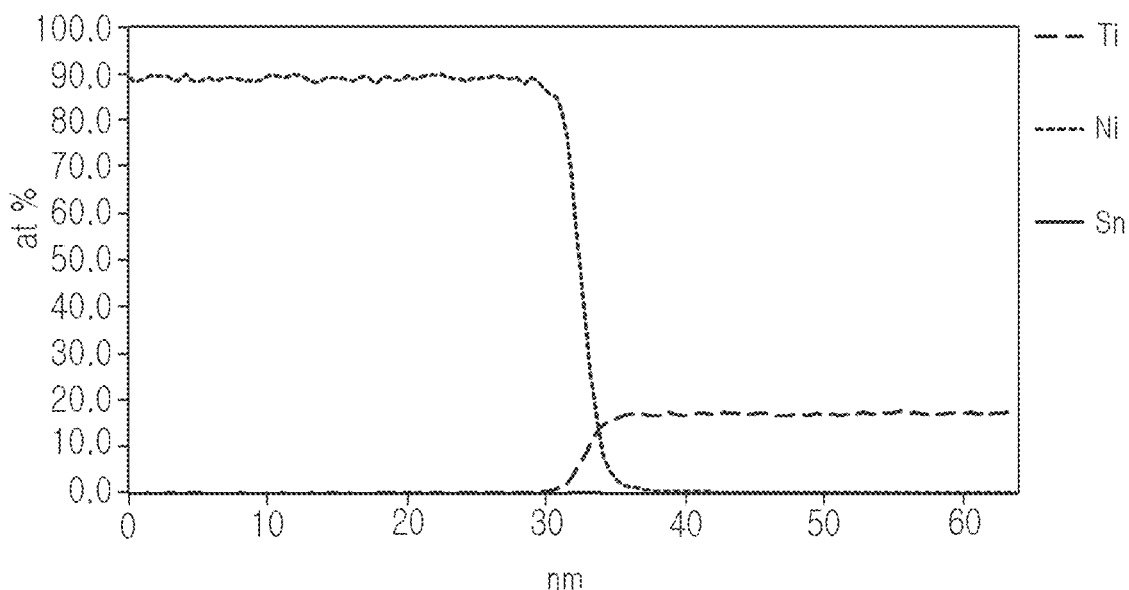
FIGS. 11A and 11B are graphs illustrating results obtained by performing a line profile using an STEM-EDS in a direction perpendicular to an interface between a dielectric layer and an internal electrode in FIGS. 10A and 10B.
Figure 11B:
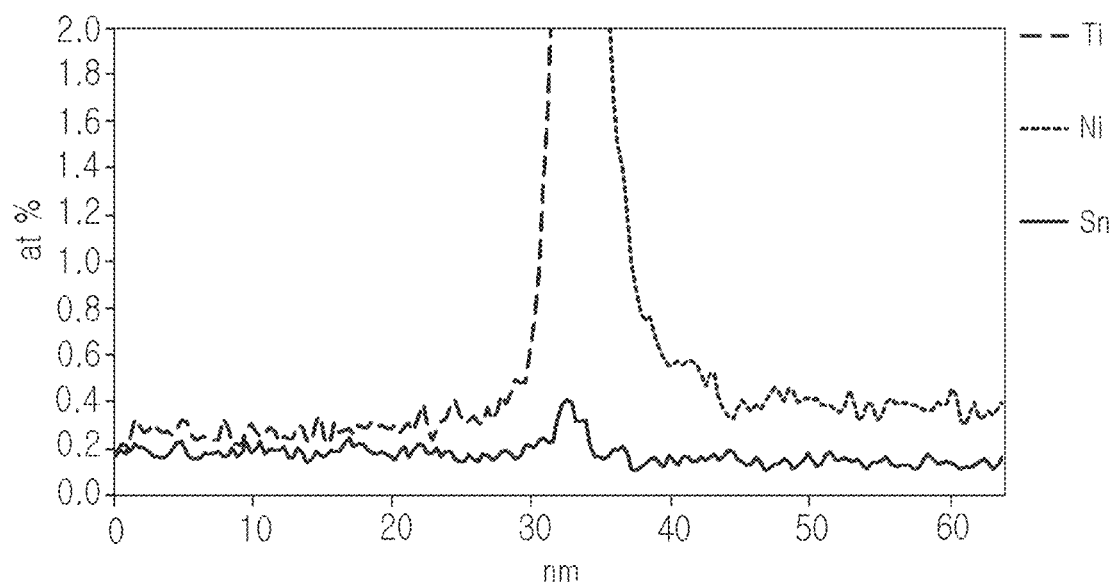

FIGS. 10A and 10B are an image obtained by scanning a portion corresponding to region P1 of FIG. 6 with an STEM and an image illustrating a result obtained by mapping a Sn element with an STEM-EDS in the Inventive Example, respectively, and FIGS. 11A and 11B are graphs illustrating results obtained by performing a line profile using an STEM-EDS in a direction perpendicular to an interface between a dielectric layer and an internal electrode in FIGS. 10A and 10B. FIG. 11B is an enlarged view of a portion of 0 at % to 2.0 at % in FIG. 11A.

It can be seen that in the Inventive Example, a content of Sn has a peak value of 0.4 at % on the interface between the dielectric layer and the internal electrode. In addition, it was measured that some Sn exists in the central portion of the internal electrode and the dielectric layer, but Sn existing in the central portion of the internal electrode and the dielectric layer is about equal to a level measured in Comparative Example, and may thus be determined as a value corresponding to noise.

In addition, in the Inventive Example, contents of elements in a region of 200 nm×200 nm corresponding to region P2 (a dielectric layer in a region spaced apart from a boundary surface between the active portion and the side margin portion toward the active portion by 1 μm) and region P3 (a region spaced apart from the boundary surface between the active portion and the side margin portion outwardly of the side margin portion by 1 μm) of FIG. 6 were quantitatively analyzed using an STEM-EDS, and were shown in Table 1. In Table 1, a unit of the content of each element may be at %.

TABLE 1

| Division | O | Al | Si | Ti | V | Mn | Ni | Zr | Ba | Dy | Sn |
|---|---|---|---|---|---|---|---|---|---|---|---|
| P2 | 53.69 | 2.37 | 0.12 | 22.44 | 1.14 | 0.11 | 0.37 | 0.86 | 18.63 | 0.26 | 0.00 |
| P3 | 57.24 | 2.16 | 0.21 | 20.41 | 1.06 | 0.05 | 0.24 | 0.88 | 17.30 | 0.21 | 0.24 |

Referring to Table 1, it can be seen that in the Inventive Example, Sn does not exist in the dielectric layer of the active portion, but exists in the side margin portion.

Figure 12A:
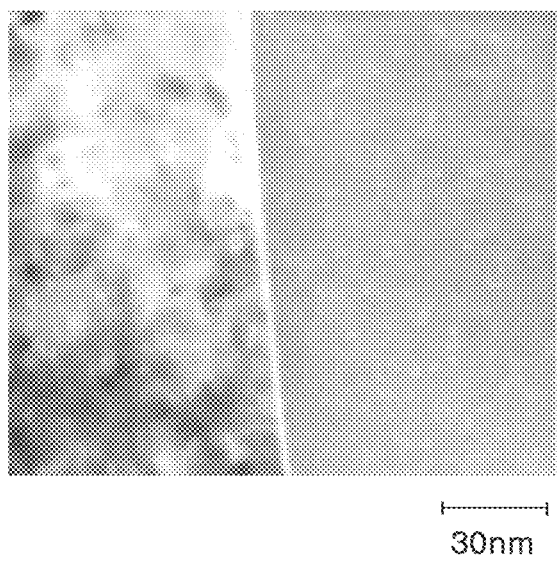
FIGS. 12A and 12B are an image obtained by scanning a portion corresponding to region P3 of FIG. 6 with an STEM and an image illustrating a result obtained by mapping a Sn element with an STEM-EDS in the Inventive Example, respectively.
Figure 12B:
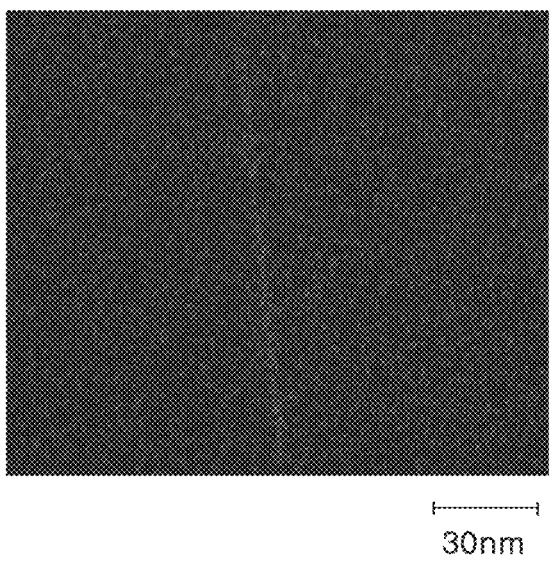
Figure 13A:
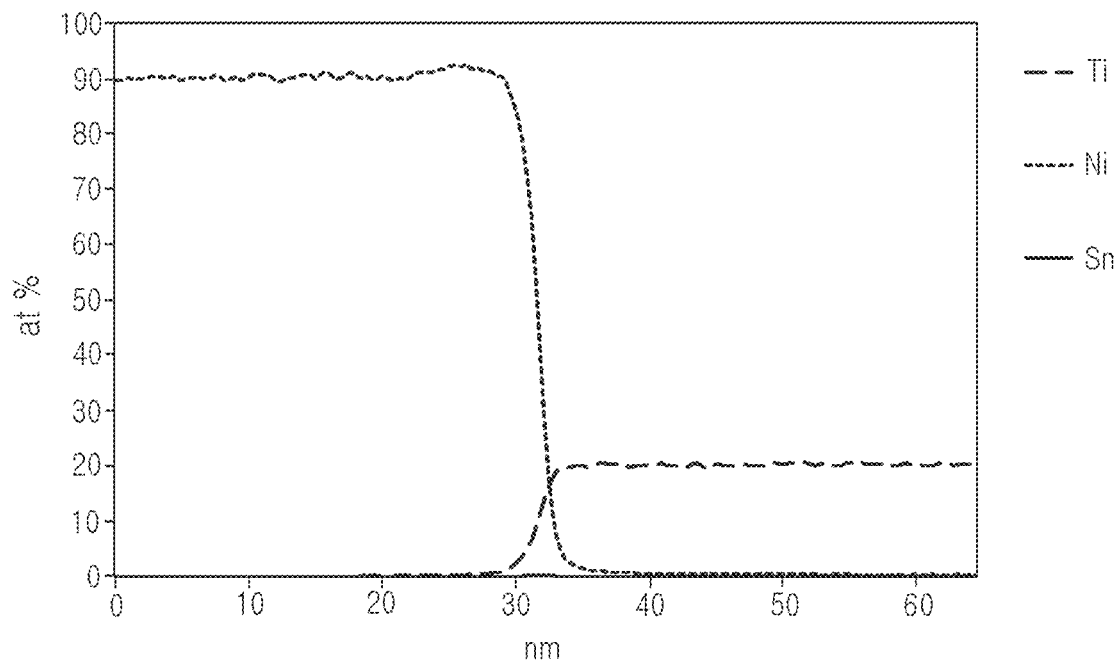
FIGS. 13A and 13B are graphs illustrating results obtained by performing a line profile using an STEM-EDS in a direction perpendicular to an interface between a dielectric layer and an internal electrode in FIGS. 12A and 12B.
Figure 13B:
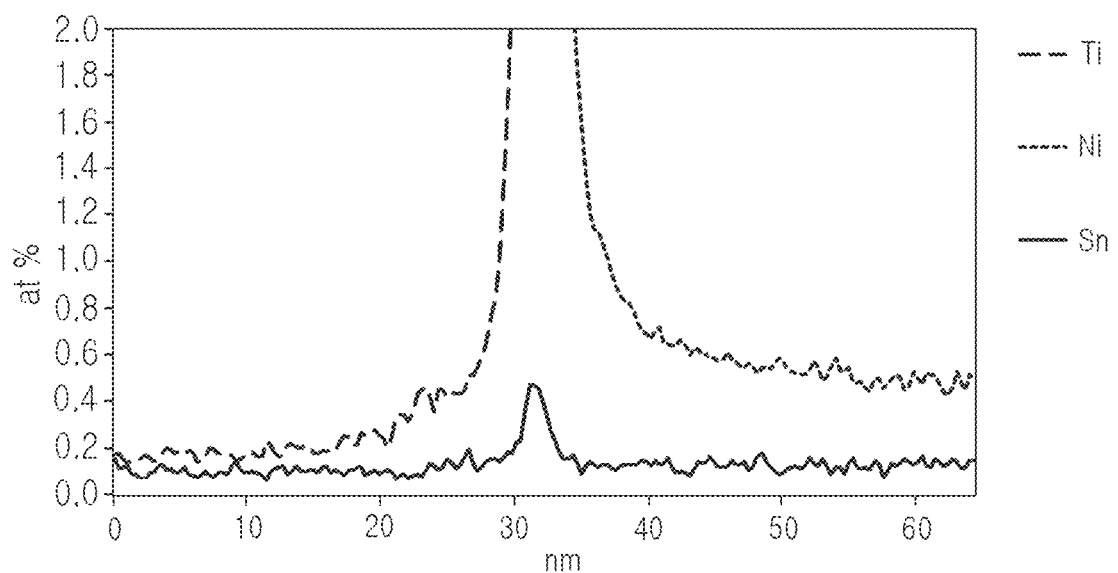

Next, a portion corresponding to P4 of FIG. 7 in the Inventive Example was analyzed. FIGS. 12A and 12B are an image obtained by scanning a portion corresponding to region P4 of FIG. 7 with an STEM and an image illustrating a result obtained by mapping a Sn element with an STEM-EDS in the Inventive Example, respectively. FIGS. 13A and 13B are graphs illustrating results obtained by performing a line profile using an STEM-EDS in a direction perpendicular to an interface between a dielectric layer and an internal electrode in FIGS. 12A and 12B. FIG. 13B is an enlarged view of a portion of 0 at % to 2.0 at % in FIG. 13A.

It can be seen that a content of Sn has a peak value of 0.48 at % on the interface between the dielectric layer and the internal electrode. In addition, it was measured that some Sn exists in the central portion of the internal electrode and the dielectric layer, but Sn existing in the central portion of the internal electrode and the dielectric layer is about equal to a level measured in Comparative Example, and may thus be determined as a value corresponding to noise. A thickness of an interface portion may be defined as a full width at half maximum (FWHM) of a content of Sn, and in FIGS. 13A and 13B, a thickness of an interface portion may be about 2 nm.

Therefore, summing up the above analysis results, it can be seen that in the Inventive Example, Sn is hardly detected in the center portion of the internal electrode and the dielectric layer and Sn is detected in the interface portion and the side margin portion.

Next, high-temperature accelerated life and moisture resistance reliability for Inventive Example and Comparative Example were evaluated and shown in Table 2.

As for the high-temperature accelerated life evaluation, 50 samples were prepared for each of the Invention Example and Comparative Example, a voltage of 6V was applied to these samples at a temperature of 105° C. for one hour, and the number of samples of which insulation resistance is decreased to 10 KΩ or less was shown in Table 2.

As for the moisture resistance reliability evaluation, 50 samples were prepared for each of the Invention Example and Comparative Example, a voltage of 6V was applied to these samples at a temperature of 85° C. and at a relative moisture of 85% for six hours, and the number of samples of which insulation resistance is decreased to 1.0E+04 or less was shown in Table 2.

TABLE 2

| Division | High-Temperature Accelerated Life | Moisture Resistance Reliability |
|---|---|---|
| Inventive Example | 0/50 | 1/50 |

TABLE 2-continued

| Division | High-Temperature Accelerated Life | Moisture Resistance Reliability |
|---|---|---|
| Comparative Example | 3/50 | 4/50 |

It can be seen that in the Inventive Example, the high-temperature accelerated life and the moisture resistance reliability are excellent.

Figure 14:
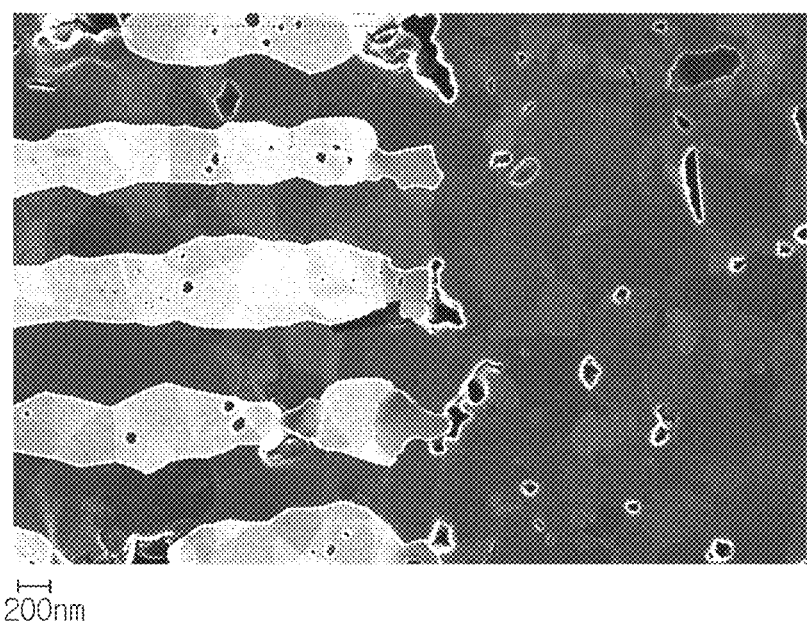
FIG. 14 is an image obtained by scanning an interface between a dielectric layer and an internal electrode according to Comparative Example with an SEM.
Figure 15:
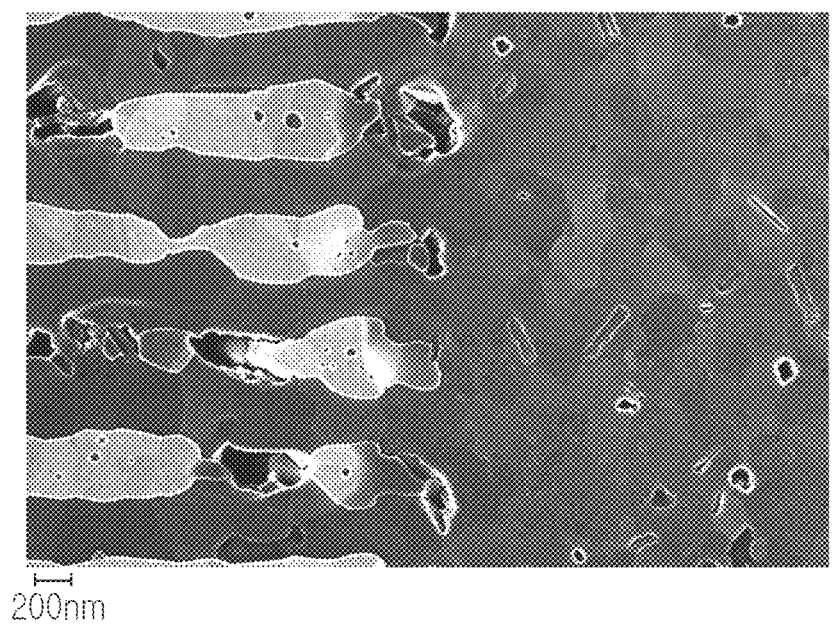
FIG. 15 is an image obtained by scanning an interface between a dielectric layer and an internal electrode according to Inventive Example with an SEM.

Meanwhile, referring to FIG. 14 (Comparative Example) and FIG. 15 (Inventive Example), which images obtained by scanning an interface between a dielectric layer and an internal electrode with an SEM, it can be seen that there is no significant difference in a size of dielectric grains according to whether or not Sn is added.

Therefore, it may be determined that an improvement effect of the high-temperature accelerated life and the moisture resistance reliability is due to Sn included in the side margin portion and the interface portion.

As set forth above, according to an exemplary embodiment in the present disclosure, the reliability of the multilayer electronic component may be improved by controlling contents of Sn for each position.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a body including dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction;
side margin portions disposed on the fifth and sixth surfaces, respectively; and
external electrodes disposed on the third and fourth surfaces, respectively,
wherein the body includes an active portion including internal electrodes disposed alternately with the dielectric layers in the first direction and cover portions disposed on opposite end surfaces of the active portion in the first direction, respectively,
one of the internal electrodes includes a central portion and an interface portion disposed between the central portion and one of the dielectric layers,
the interface portion and one of the side margin portions include Sn,
a content of Sn included in the one of the side margin portions is higher than a content of Sn included in one of the cover portions, and
a content of Sn included in the one of the side margin portions in a region spaced apart from a boundary between the active portion and the one of the side margin portions outwardly of the one of the side margin portions by 1 μm is 0.2 at % or more and 1.0 at % or less.

2. The multilayer electronic component of claim 1, wherein a content of Sn included in the interface portion and the one of the side margin portions is higher than that of Sn included in the one of the dielectric layers and the central portion.

3. The multilayer electronic component of claim 2, wherein a maximum value of the content of Sn in the interface portion is 0.3 at % or more and 1.0 at % or less.

4. The multilayer electronic component of claim 2, wherein the content of Sn included in the one of the dielectric layers and the central portion is 0.1 at % or less.

5. The multilayer electronic component of claim 2, wherein in a cross section of the body cut in the first and third directions at a center of the body in the second direction, and
a content of Sn included in the one of the dielectric layers in a region spaced apart from a boundary between the active portion and the one of the side margin portions toward the active portion by 1 μm is 0.1 at % or less.

6. The multilayer electronic component of claim 1, wherein a thickness of the interface portion is 1 nm or more and 5 nm or less.

7. The multilayer electronic component of claim 1, wherein in a region at a central portion of the body in the third direction on a cross section of the body cut in the first and third directions at a center of the body in the second direction, an at % of Sn included in the interface portion is higher than an at % of Sn included in the one of the dielectric layers and the central portion of the one of the internal electrodes.

8. The multilayer electronic component of claim 1, wherein the external electrodes include a first external electrode disposed on the third surface and a second external electrode disposed on the fourth surface, and the internal electrodes include first internal electrodes in contact with the first external electrode and second internal electrodes in contact with the second external electrode, and
both end portions of the first and second internal electrodes in the third direction are in contact with the side margin portions, respectively.

9. The multilayer electronic component of claim 1, wherein the one of the side margin portions is formed by stacking first ceramic green sheets including 0.2 mol or more and 4.0 mol or less of Sn based on 100 mol of $BaTiO_3$ in the third direction.

10. The multilayer electronic component of claim 9, wherein the dielectric layers are formed by stacking second ceramic green sheets that do not include Sn in the first direction.

11. The multilayer electronic component of claim 10, wherein the internal electrodes are formed by applying a conductive paste that does not include Sn on the second ceramic green sheets.

12. The multilayer electronic component of claim 1, wherein the one of the side margin portions is formed by stacking first ceramic green sheets including 1.0 mol or more and 4.0 mol or less of Sn based on 100 mol of $BaTiO_3$ in the third direction.

13. The multilayer electronic component of claim 12, wherein the dielectric layers are formed by stacking second ceramic green sheets that do not include Sn in the first direction.

14. The multilayer electronic component of claim 13, wherein the internal electrodes are formed by applying a conductive paste that does not include Sn on the second ceramic green sheets.

15. The multilayer electronic component of claim 1, wherein an at % of Sn included in the one of side margin portions is higher than at % of Sn included in the one of the dielectric layers and the central portion.

16. A multilayer electronic component comprising:
a body including dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction;
side margin portions disposed on the fifth and sixth surfaces, respectively; and
external electrodes disposed on the third and fourth surfaces, respectively,
wherein the body includes an active portion including internal electrodes disposed alternately with the dielectric layers in the first direction and cover portions disposed on opposite end surfaces of the active portion in the first direction, respectively,
one of the internal electrodes includes a central portion and an interface portion disposed between the central portion and one of the dielectric layers,
the interface portion and one of the side margin portions include Sn, and
an average value of a content of Sn in the interface portion is 0.25 at % or more and 0.7 at % or less.

* * * * *